(12) United States Patent
Mueller

(10) Patent No.: US 8,340,125 B2
(45) Date of Patent: Dec. 25, 2012

(54) METHOD AND APPARATUS FOR BLOCK ACKNOWLEDGEMENT IN A COMMUNICATION NETWORK

(75) Inventor: Arndt J. Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 225 days.

(21) Appl. No.: 12/688,535

(22) Filed: Jan. 15, 2010

(65) Prior Publication Data

US 2010/0183027 A1  Jul. 22, 2010

Related U.S. Application Data

(60) Provisional application No. 61/145,327, filed on Jan. 16, 2009.

(51) Int. Cl.
*H04J 3/16* (2006.01)
(52) U.S. Cl. .......................... 370/468; 370/321; 370/462
(58) Field of Classification Search .................... None
See application file for complete search history.

(56) References Cited

U.S. PATENT DOCUMENTS

| | | | |
|---|---|---|---|
| 7,161,942 B2 * | 1/2007 | Chen et al. | 370/392 |
| 2007/0253391 A1 | 11/2007 | Shao et al. | |
| 2008/0117929 A1 * | 5/2008 | Kliger et al. | 370/442 |
| 2008/0192752 A1 | 8/2008 | Hyslop et al. | |
| 2008/0279155 A1 | 11/2008 | Pratt, Jr. et al. | |
| 2010/0002582 A1 * | 1/2010 | Luft et al. | 370/230.1 |
| 2010/0254402 A1 * | 10/2010 | Kliger et al. | 370/442 |

* cited by examiner

*Primary Examiner* — Donald Mills
(74) *Attorney, Agent, or Firm* — Bruce Greenhaus; Duane Morris LLP

(57) ABSTRACT

A method includes receiving a request for bandwidth from a first network node of a coordinated network and broadcasting a first transmission schedule to a plurality of network nodes including the first network node. The first transmission schedule allocates bandwidth for the first network node to transmit data to a second network node. An acknowledgement (ACK) message is received from the second network node identifying that the second network node successfully received the data from the first network node.

40 Claims, 6 Drawing Sheets

US 8,340,125 B2

METHOD AND APPARATUS FOR BLOCK ACKNOWLEDGEMENT IN A COMMUNICATION NETWORK

CROSS-REFERENCE TO RELATED APPLICATIONS

This application claims priority to U.S. Provisional Patent Application No. 61/145,327, which was filed on Jan. 16, 2009, the entirety of which is incorporated by reference herein.

FIELD OF DISCLOSURE

The disclosed methods and apparatus relate to data transmission. More specifically, the disclosed methods relate to data transmission in coordinated networks.

BACKGROUND

Many communication systems include an automatic repeat request (ARQ) error controlling method to ensure data is successfully transmitted from one network node to another. For example, in a "stop and wait" ARQ, a transmitting node transmits a first data packet to a receiving node and then waits until it receives an acknowledgement (ACK) message from the receiving node identifying that the receiving node has successfully received the first data packet. The transmitting node sends a second data packet once it receives the ACK message from the receiving node. If the transmitting node does not receive an ACK message from the receiving node within a predetermined period of time, then the transmitting node will retransmit the first data packet to the receiving node and wait to receiving an ACK message. In some ARQ methods, a negative ACK (NACK or NAK) message is transmitted from the receiving node to the transmitting node if a data packet is not successfully received.

In coordinated networks, e.g., a communication network in which data transmission is scheduled by one of the network nodes referred to as a Network Coordinator ("NC"), the transmission of the ACK or NACK messages from the receiving node to the transmitting node are scheduled by the NC. Accordingly, although the ARQ methods improve the reliability of data transmission by notifying the transmitting node that a data packet has not been properly received, such methods also impose latency and jitter issues as well as sometimes requiring packet reordering. Additionally, ARQ methods require memory for storing packets in the transmitting nodes that may have to retransmit a packet in addition to requiring system bandwidth in order to retransmit the unsuccessfully received data packet.

SUMMARY

An apparatus and method are disclosed that includes receiving a request for bandwidth from a first network node of a coordinated network and broadcasting a first transmission schedule to a plurality of network nodes including the first network node. The first transmission schedule allocates bandwidth for the first network node to transmit data to a second network node. An acknowledgement (ACK) message is received from the second network node identifying that the second network node successfully received the data from the first network node.

Another apparatus and method are disclosed in which a request for bandwidth is transmitted to a network controller of a coordinated network. The request for bandwidth is for transmitting data to a first node. A first transmission schedule for each of a plurality of network nodes in the coordinated network is received from the network coordinator. The first transmission schedule allocates bandwidth for transmitting the data to the first network node. The data is transmitted to the first network node in the allocated bandwidth in accordance with the first transmission schedule.

Also disclosed are an apparatus and a method in which a first transmission schedule for each of a plurality of network nodes in a coordinated network is received from a network coordinator. The first transmission schedule allocates bandwidth for receiving data from a first network node. The data is received from the first network node in accordance with the first transmission schedule, and an acknowledgement (ACK) message is transmitted to the network coordinator if the data is successfully received from the first network node.

DETAILED DESCRIPTION

The improved methods and apparatus for acknowledging data transmission in a coordinated network are described with reference to a Multimedia over Coaxial Alliance (MoCA) network. However, one skilled in the art will understand that the disclosed apparatus and methods are not limited to MoCA networks, but may be implemented in a wide variety of coordinated networks in which data transmission is scheduled by one of the network nodes.

Figure 1:
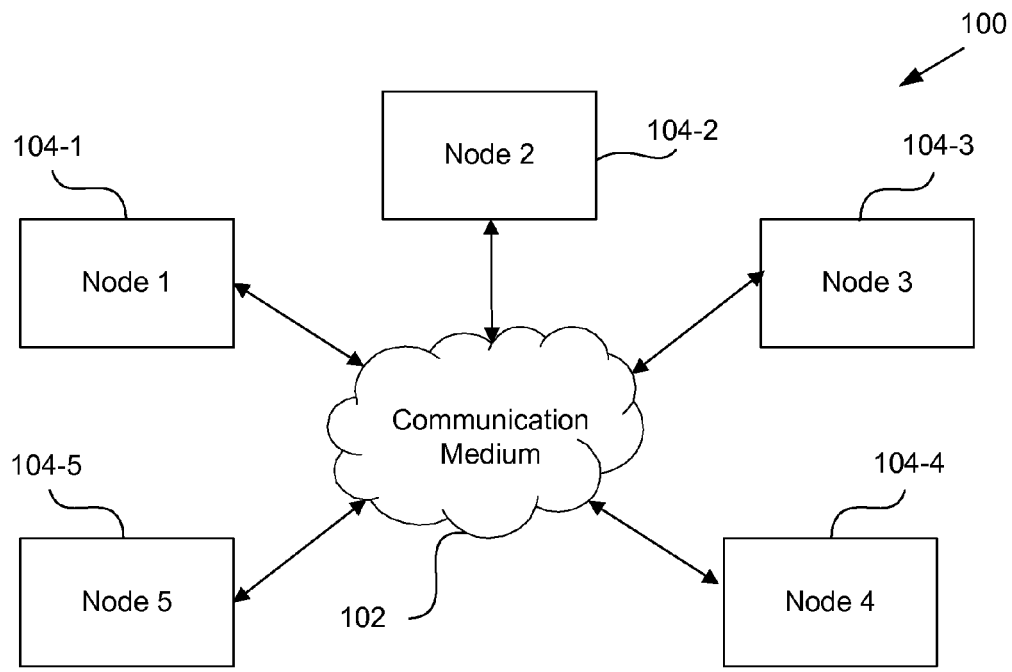
FIG. 1 is a block diagram of one example of a coordinated network.

FIG. 1 is a block diagram of one example of a coordinated network 100. As shown in FIG. 1, a plurality of network nodes 104-1:104-5 (collectively referred to as "network nodes 104") may be communicatively coupled to each other through communication medium 102. Although five network nodes are shown in FIG. 1, one skilled in the art will understand that fewer or more nodes may be coupled to each other through communication medium 102 to form a coordinated network. The network nodes 104 may be devices of a home entertainment system such as, for example, set top boxes (STBs), television (TVs), computers, DVD or Blu-ray players, gaming consoles, to name a few, each coupled to each other via the communication medium 102. Examples of the communication medium 102 include, but are not limited to, coaxial cable, fiber optic cable, a wireless transmission medium, and an Ethernet connection, to name a few.

Figure 2:
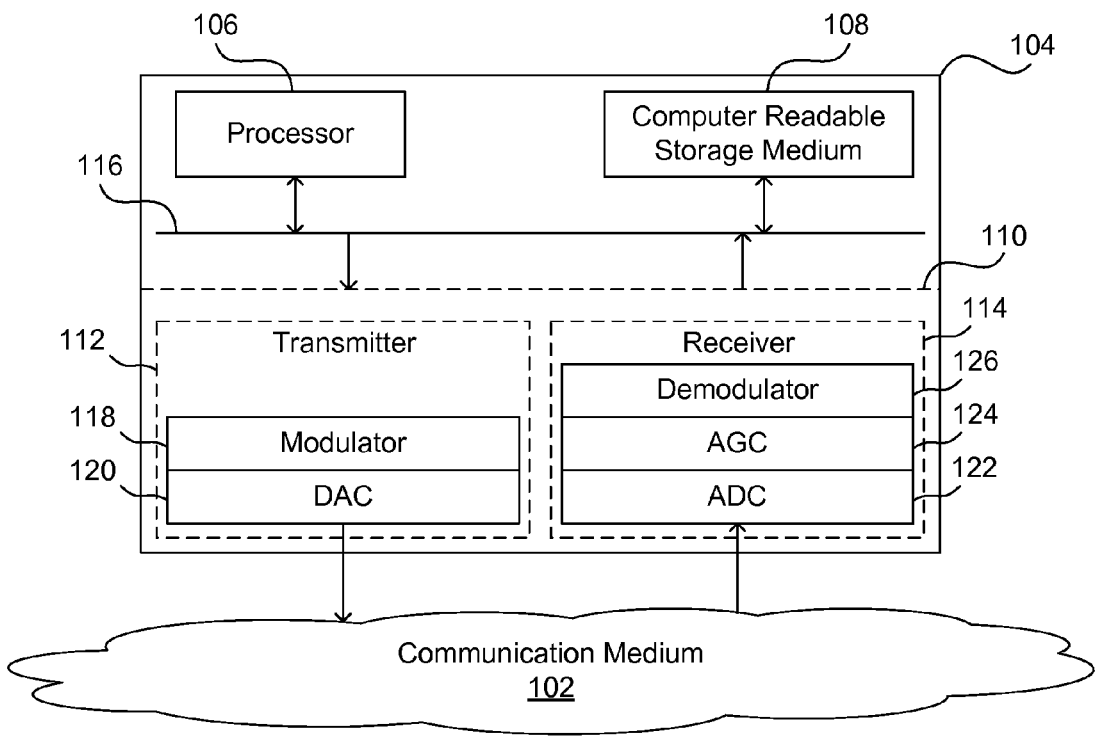
FIG. 2 is a block diagram of one example of a network node in accordance with the coordinated network illustrated in FIG. 1.

FIG. 2 illustrates a simplified block diagram of one example of a network node 104. As shown in FIG. 2, network node 104 may include a physical interface 110 including a transmitter 112 and a receiver 114, which are in data communication with a processor 106 through a data bus 116 as illustrated in FIG. 2. The transmitter 112 may include a modulator 118 for modulating data onto a plurality of orthogonal frequency division multiplexed (OFDM) subcarriers according to a quadrature amplitude modulation (QAM) scheme such as, for example, 8-QAM, 16-QAM, 32-QAM, 64-QAM, 128-QAM, or 256-QAM, and a digital-to-analog converter (DAC) 120 for transmitting modulated signals to other network nodes 104 through the communication medium 102.

Receiver 114 may include an analog-to-digital converter (ADC) 122 for converting a modulated analog signal received from another network node 104 into a digital signal. Receiver 114 may also include an automatic gain control (AGC) circuit 124 for adjusting the gain of the receiver 114 to properly receive the incoming signal and a demodulator 126 for demodulating the received signal. One skilled in the art will understand that the network nodes 104 may include additional circuitry and functional elements not described herein.

Processor 106 may be any central processing unit (CPU), microprocessor, micro-controller, or computational device or circuit for executing instructions. As shown in FIG. 2, the processor 106 is in signal communication with a computer readable storage medium 108 through data bus 116. The computer readable storage medium may include a random access memory (RAM) and/or a more persistent memory such as a read only memory (ROM). Examples of RAM include, but are not limited to, static random-access memory (SRAM), or dynamic random-access memory (DRAM). A ROM may be implemented as a programmable read-only memory (PROM), an erasable programmable read-only memory (EPROM), an electrically erasable programmable read-only memory (EEPROM), or like device configured to store data and instructions that may be executed by the processor 106 as will be understood by one skilled in the art.

In a Multimedia Over Coaxial Alliance (MoCA) network, data packets are transmitted over a coaxial communication channel and the communication between network nodes 104 is managed by a Network Coordinator (NC) node. The NC may be any of the plurality of network nodes 104 and may switch from node to node over time as network nodes join and/or leave the network. The NC periodically broadcasts Beacons and Media Access Plan (MAP) packets to the nodes connected to the network. The Beacons are transmitted at regular intervals (e.g., every 10 ms) and identify the channel time clock (CTC), the MoCA network version, the time of the next admission control frame (ACF), and when a NC handoff will occur (e.g., when the NC changes from one network node to another network node). MAP packets are transmitted more frequently by the NC than are Beacons and provide scheduling information that identify when each network node will be transmitting data through the network. The NC may receive reservation requests from each of the plurality of network nodes 104 between MAP packet transmissions in which each of the network nodes 104 report their transmission capabilities and request to transmit data to other network nodes.

Figure 3:
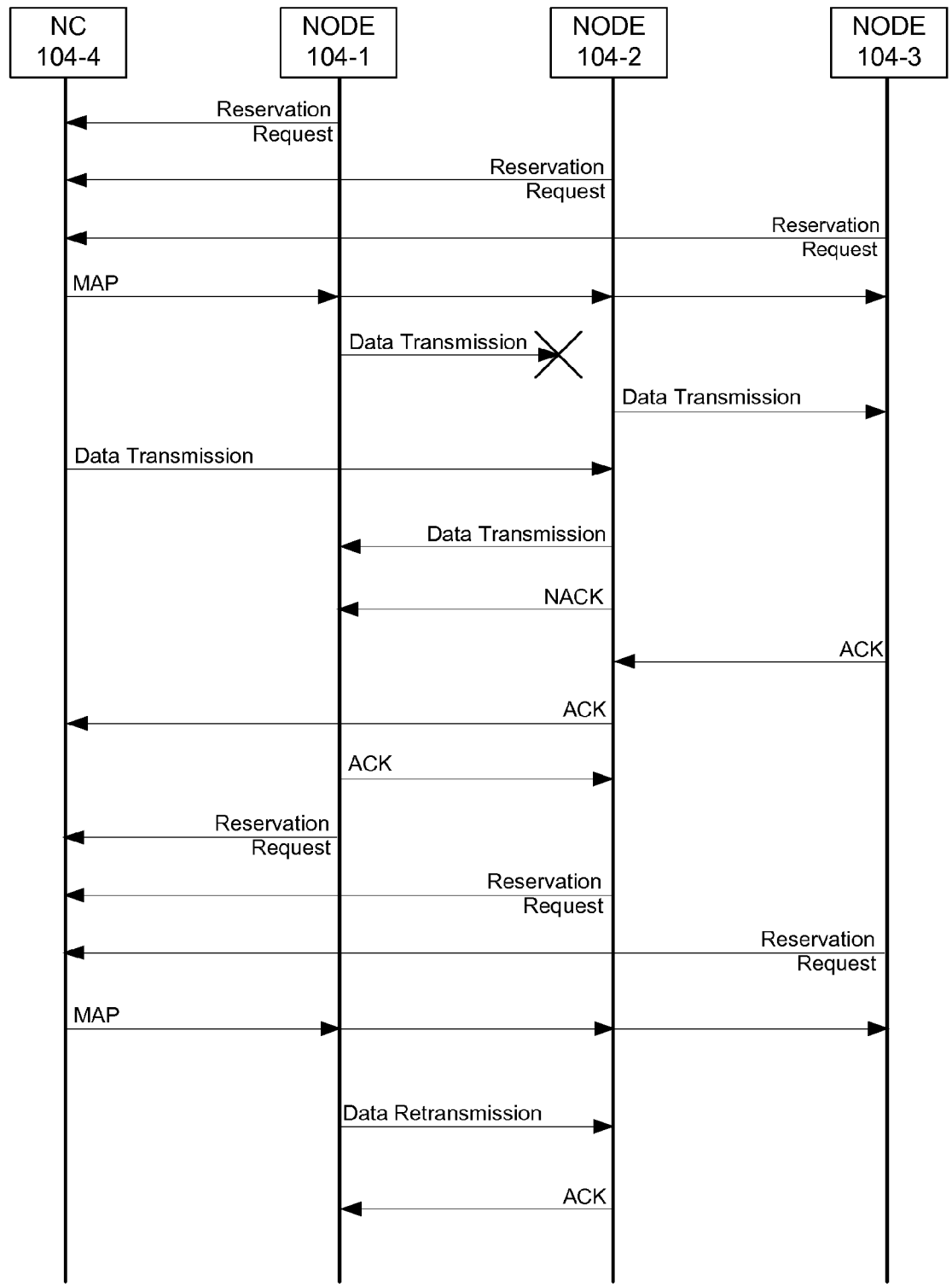
FIG. 3 is a timing diagram of a conventional data transmission acknowledgement methodology in a coordinated system of the PRIOR ART.

FIG. 3 is one example of a timing diagram for setting up a data flow in a conventional MoCA network. As shown in FIG. 3, bandwidth reservation requests are transmitted to the NC, which in this example is network node 104-4, from network nodes 104-1, 104-2, and 104-3. NC 104-4 broadcasts a MAP packet to each of the network nodes 104-1:104-3. The MAP packet may identify the transmission schedule including the bandwidth allocated to each of the plurality of nodes 104 in the network.

After the MAP is received by each of the network nodes 104-1:104-3, data transmission begins with node 104-1 transmitting data to node 104-2, node 104-2 transmitting data to node 104-3, the NC 104-4 transmitting data to node 104-2, and node 104-2 transmitting data to node 104-1. Each data transmission is successful except for the data transmission from node 104-1 to node 104-2. Accordingly, an acknowledgement (ACK) message is transmitted from node 104-3 to node 104-2, from node 104-2 to NC 104-4, and from node 104-1 to node 104-2, and a negative ACK (NACK) message is transmitted from node 104-2 to node 104-1.

Next, reservation requests from nodes 104-1:104-3 are transmitted to NC 104-1 with only node 104-1 requesting bandwidth in order to retransmit the data to node 104-2. NC 104-4 transmits the next MAP packet in which the bandwidth for retransmitting data is reallocated for node 104-1 to transmit data to node 104-2. After the MAP is received by each of the nodes 104-1:104-3, data transmission begins and node 104-1 retransmits the data to node 104-2. Node 104-2 transmits an ACK message upon successfully receiving the data from node 104-1.

The conventional acknowledgement method described above requires network bandwidth for not only retransmitting the data from the transmitting node to the receiving node, but also for the transmitting node to transmit an ACK or NACK message to the transmitting network node, which in turn transmits a request for bandwidth to the NC for retransmitting the data to the receiving node. Additionally, the transmitting network node will then wait until a MAP packet is received that allocates bandwidth for the retransmission of the data, which induces packet latency and jitter.

Figure 4:
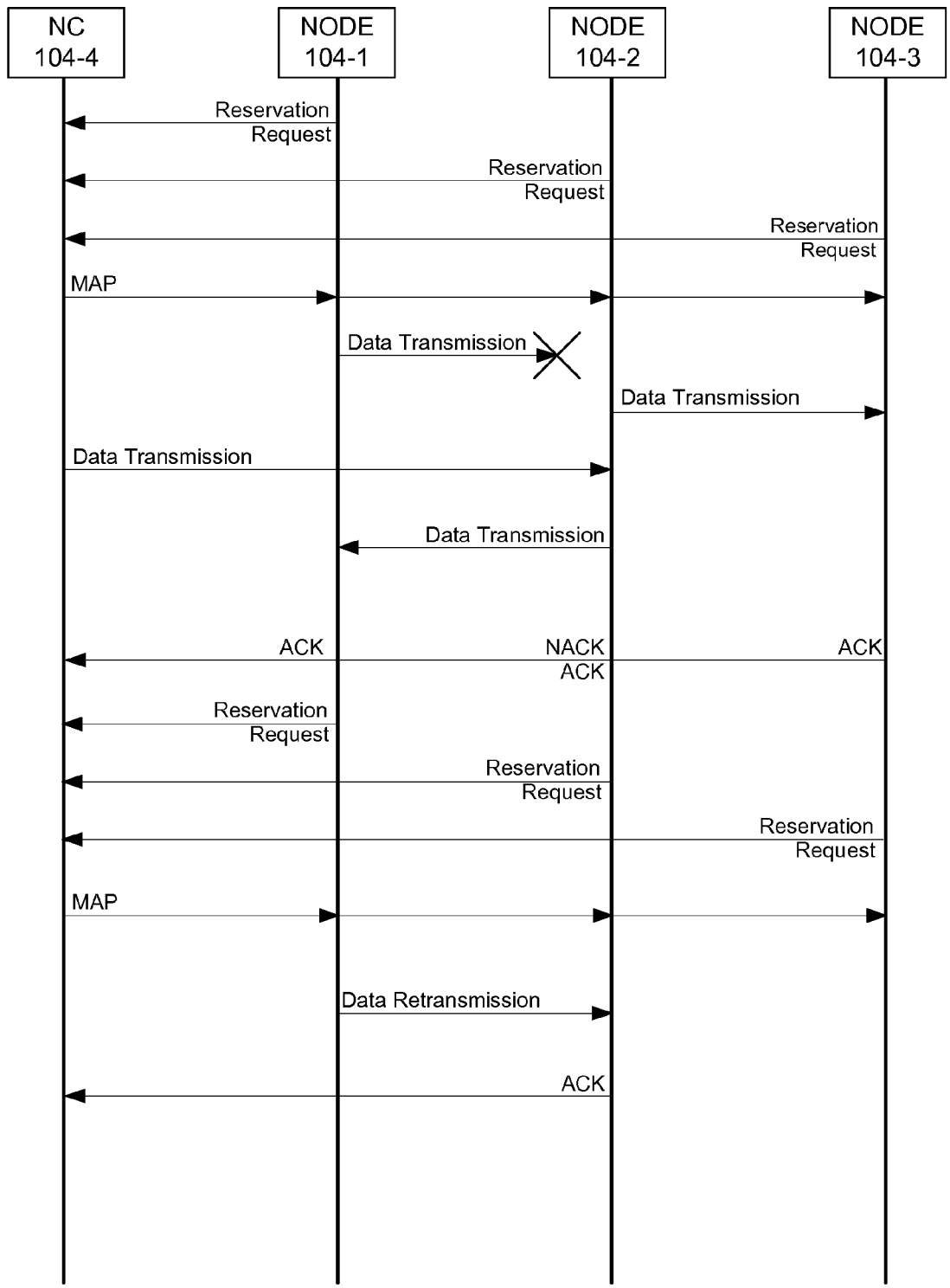
FIG. 4 is a timing diagram of an improved data transmission acknowledgement methodology in a coordinated system.

FIG. 4 is one example of a timing diagram of an improved method of acknowledging data transmission in a coordinated network. As shown in FIG. 4, bandwidth reservation requests are transmitted from network nodes 104-1:104-3 to NC 104-4. NC 104-4 receives the reservation requests from network nodes 104-1:104-3 and determines a transmission schedule. The reservation requests may identify the type of data transmission, e.g., the quality of service required, the available resources of the network node that transmitted the service request, the data size that is to be transmitted by the network node, and the identity of the network nodes that are to be receiving the data transmission. The transmission schedule generated by NC 104-4, which may be based on the data received in the reservation requests from each of the network nodes 104-1:104-3, may allocate the bandwidth and/or transmission time or time slot at which a network node is to transmit data. The transmission schedule may be transmitted to each of the network nodes 104 as a MAP packet.

Network nodes 104 transmit data after receiving the first MAP packet. For example, node 104-1 transmits data to node 104-2, node 104-2 transmits data to node 104-3, NC 104-4 transmits data to node 104-2, and node 104-2 transmits data to node 104-1. As shown in FIG. 4, the node 104-2 does not successfully receive the data transmitted from node 104-1.

Instead of each of the receiving nodes transmitting an ACK or NACK message to the network node for each packet it was scheduled to receive, the ACK and NACK messages are aggregated into a single message and directly transmitted to NC 104-4. One skilled in the art will understand that there are numerous methods through which the ACK and NACK messages may be transmitted directly to the NC. In one implementation, for example, NC 104-4 may schedule an "ACK slot" for each of the network nodes scheduled to receive a data packet. Accordingly, a MAP packet may assign bandwidth and/or a time slot in which each of the network nodes scheduled to receive a data packet in the MAP packet is scheduled to transmit an ACK or NACK message to the NC. In another implementation, the receiving network nodes transmit their respective ACK or NACK messages to the NC 104-4 using orthogonal frequency division multiple access (OFDMA). For example, each of the receiving nodes may be assigned a unique set of sub-carriers to signal an ACK or NACK. The sub-carrier assignments may be determined by the NC 104-4 and reported to the network nodes 104 in the same MAP packet that includes the data transmission schedule. In yet another implementation, the receiving network nodes piggyback the ACK or NACK messages to another packet already scheduled for transmission to the NC 104-4. For example, each of the receiving nodes may piggyback the ACK and NACK messages to reservation requests. In yet another implementation, the receiving network nodes transmit their respective ACK or NACK messages using code division multiple access (CDMA). CDMA reporting may be implemented in a similar manner as OFDMA described above, except that unique spreading codes instead of unique sub-carriers would be included in the MAP packets broadcast by the NC 104-4. One skilled in the art will understand that other techniques may be implemented for transmitting acknowledgement messages to the NC.

Referring again to FIG. 4, each of the network nodes 104-1:104-3 may transmit reservation requests to NC 104-4 once the ACK and/or NACK messages have been transmitted. In some embodiments, the reservation requests may be omitted or they may include the ACK or NACK messages. Having received the ACK and/or NACK messages and the reservation requests from each of the network nodes 104-1:104-3, NC 104-4 determines a second transmission schedule, which may be based on the data reported in the reservation request messages received from the network nodes 104 as described above. The second transmission schedule, which includes reallocated bandwidth for network node 104-1 for retransmitting data to network node 104-2, is transmitted to each of the nodes as a MAP packet. Network node 104-1 then retransmits the data to network node 104-2 in the reallocated bandwidth.

Figure 5:
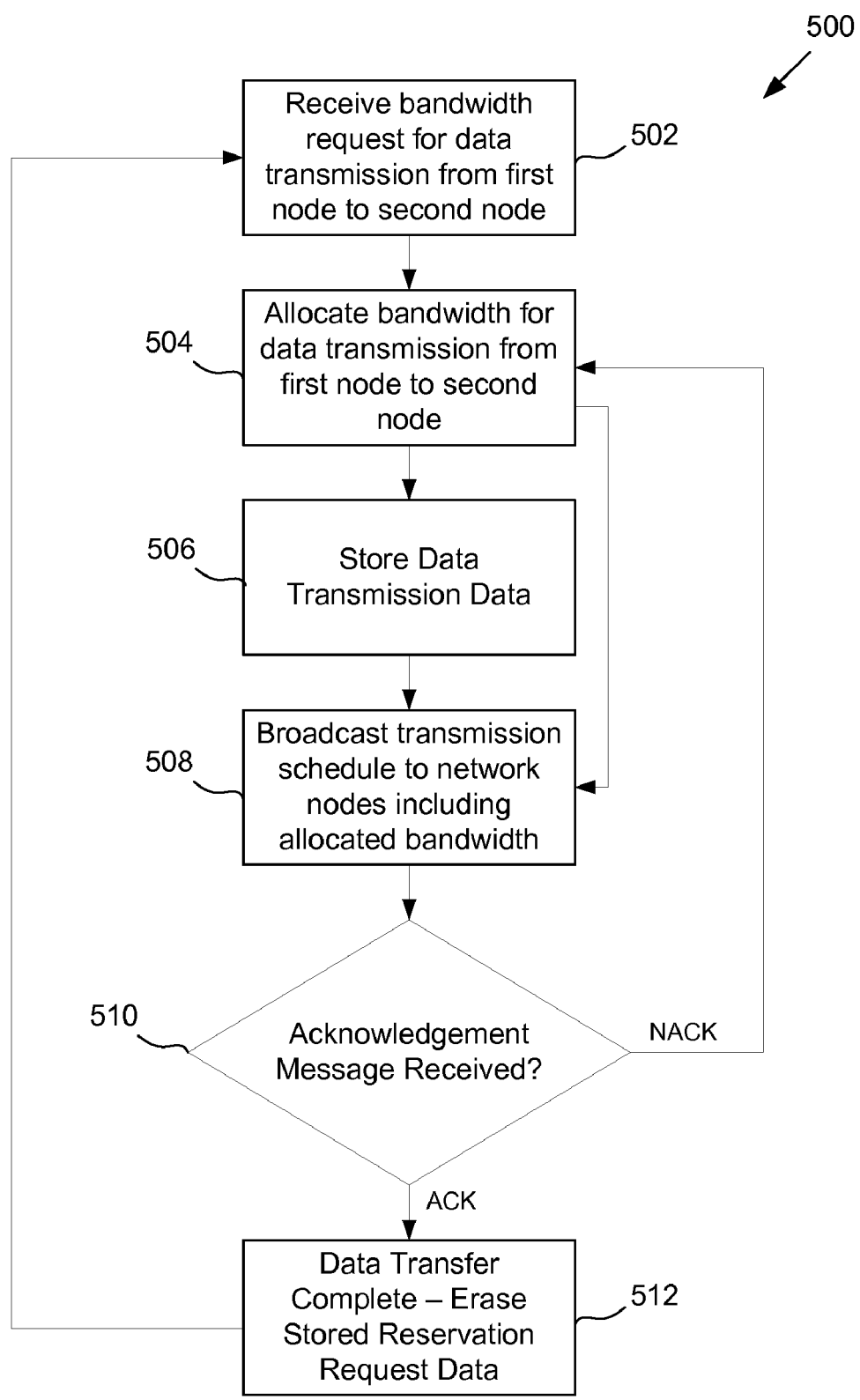
FIG. 5 is a flow diagram of one example of a method of acknowledging data transmission performed by a network coordinator in a coordinated network.

FIG. 5 is one example of a flow diagram of a method of acknowledging data transmission that may be performed by a NC. As described above, each of the network nodes may be configured to perform the functions of the network coordinator. As shown in FIG. 5, the NC receives a reservation request to transfer data from a first node to a second node at block 502. One skilled in the art will understand that the NC may receive a plurality of reservation requests from a plurality of network nodes. For example, the NC may receive a request from one node to transmit data to a plurality of network nodes (i.e., multicast transmission) and may receive a second request from a different network node to send data to another network node (i.e., unicast transmission).

At block 504, the NC determines a transmission schedule based on the reservation requests. The transmission schedule may identify bandwidth and/or transmission times for all network data transmission for the next transmission period between MAP packets. The transmission schedule, including the number of data flows, transmitting and receiving nodes associated with each data transmission, the required resources associated with each data transmission, and the size of the data being transmitted, may be stored by the NC in a computer readable storage medium for subsequent use.

The transmission schedule is broadcast to each of the network nodes as a MAP packet at block 508. At decision block 510, the NC determines which type of acknowledgment message has been received from the receiving network node. If a NACK message is received by the NC, then the NC proceeds to block 504 to reallocate the bandwidth for the data transmission from the first node to the second node in a subsequent transmission schedule. In reallocating the bandwidth and the network resources for the data transmission, the NC may retrieve the data associated with the data transmission from the first node to the second node stored at block 506 from the computer readable storage medium and use this data in developing the subsequent transmission schedule. Storing the transmission data from the previous transmission schedule at the NC advantageously enables the NC to recall the requested bandwidth and the identities of the transmitting and receiving nodes without requiring the transmitting node to resubmit a reservation request, which in turn reduces packet latency and increases bandwidth and throughput in the communication network. The NC broadcasts the subsequent transmission schedule with the reallocated bandwidth as a MAP packet to each of the plurality of network nodes.

If the NC receives an ACK message, then it may proceed to block 512 where the data transmission is completed and the data from the previously transmitted transmission schedule is erased from the computer readable storage medium. As will be understood by one skilled in the art, the NC may then continue to block 502 and receive reservation requests from each of the plurality of network nodes for setting up new data transmission flows in the coordinated network.

Figure 6:
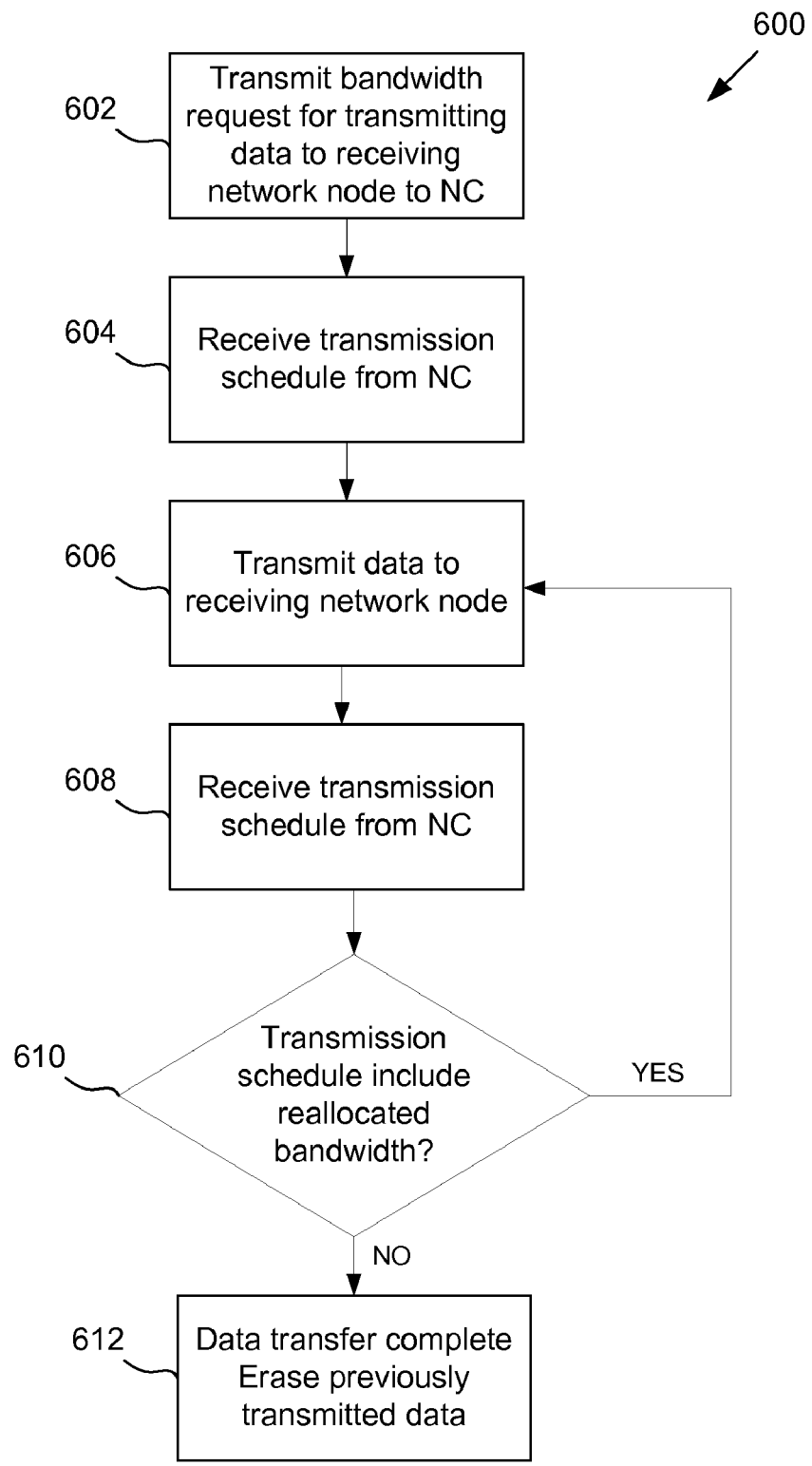
FIG. 6 is a flow diagram of one example of a method of acknowledging data transmission performing by a transmitting network node in a coordinated network.

FIG. 6 is one example of a flow diagram for a method of acknowledging data transmission that may be performed by a transmitting network node. As shown in FIG. 6, the transmitting network node transmits a request for bandwidth to transmit data to a network node to the NC. The bandwidth request may be included in the reservation request message that each network node may periodically transmit to the NC.

At block 604, the transmitting node receives the transmission schedule from the NC. As described above, the transmission schedule may be a MAP packet including allocated bandwidth and/or allocated time slot in which the transmitting network node is scheduled to transmit data to the receiving node.

The transmitting network node transmits the data to the receiving node at block 606. The data transmission from the transmitting node to the receiving node utilizes the allocated bandwidth and/or time slots identified in the transmission schedule received from the NC. The transmitting node may store a copy of the transmitted data in a computer readable storage medium in the event that the data needs to be retransmitted to the receiving node.

At block 608, the transmitting node receives a second or subsequent transmission schedule from the NC, and at decision block 610 the transmitting node determines if the second or subsequent transmission schedule includes reallocated bandwidth for retransmitting the data to the receiving node. If the second or subsequent transmission schedule includes reallocated bandwidth for retransmitting the data, then the transmitting network node may retrieve the data from memory and proceed to block 606 where it retransmits the data to the receiving network node.

If the transmission schedule does not include reallocated bandwidth for retransmitting the data to the receiving network node, then the transmitting node may proceed to block 610, where the data transmission is completed and the transmitting network node may erase the previously transmitted data from the computer readable storage medium.

Figure 7:
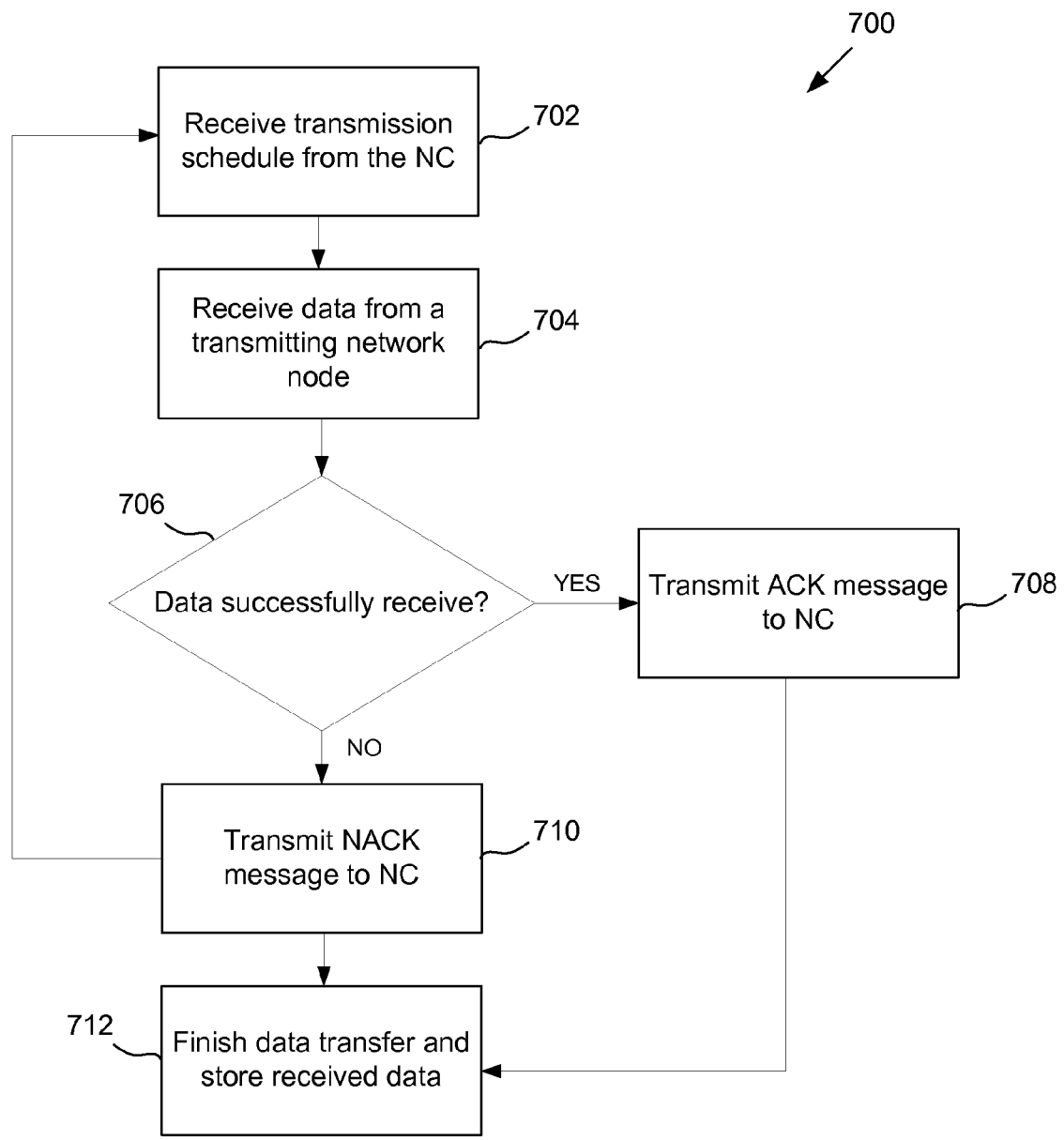
FIG. 7 is a flow diagram of one example of a method of acknowledging data transmission performed by a receiving network node in a coordinated network.

FIG. 7 is one example of a flow diagram for a method of acknowledging data transmission that may be performed by a receiving network node. As shown in FIG. 7, the receiving node receives a transmission schedule from the NC at block 702. As described above, the transmission schedule may identify bandwidth and/or time slots in which the receiving network node is scheduled to receive data from a transmitting network node.

At block 704, the receiving network node receives the data from the transmitting network node in accordance with the transmission schedule transmitted by the NC at block 702. The receiving network node may store the transmission schedule in a local computer readable storage medium for later use.

At decision block 706, the receiving network node determines if the data has been successfully received from the transmitting network node. The receiving network node may determine if the data has been successfully received by comparing the amount of received data, e.g., number of bits, bytes, etc., to an amount of data specified in the MAP packet by retrieving the MAP data from the computer readable storage medium. In some embodiments, the transmitting node may add a cyclic redundancy check (CRC) to the transmitted data, which may be used by the receiving node to determine if an error occurred in receiving the data as will be understood by one skilled in the art.

If the data was successfully received, then the receiving node proceeds to block 708 and transmits an ACK message to the NC. At block 712, the data transfer is completed and the received data is stored in a computer readable storage medium.

If the data was not successfully received, then the receiving network node transmits a NACK message to the NC at block 710. The receiving network node then proceeds to block 702 and receives another transmission schedule allocating the bandwidth and/or time slots in which the data is to be transferred from the transmitting network node to the receiving network node from the NC. Accordingly, the method is repeated until an ACK message is sent to the NC and the data transfer is completed at block 712.

The systems and methods described herein advantageously reduce the amount of bandwidth required to transmit acknowledgment messages in a coordinated network, which in turn increases the overall throughput of the network, compared to conventional systems and methods. Additionally, the improved systems and methods described herein reduces packet latency and jitter compared to conventional systems and methods.

The methods described herein may be at least partially embodied in the form of computer-implemented processes and apparatus for practicing those processes. The disclosed methods may also be at least partially embodied in the form of computer program code embodied in tangible machine readable storage media, such as random access memory (RAM), read only memories (ROMs), CD-ROMs, DVD-ROMs, BD-ROMs, hard disk drives, flash memories, or any other machine-readable storage medium, wherein, when the computer program code is loaded into and executed by a computer, the computer becomes an apparatus for practicing the method. The methods may also be at least partially embodied in the form of computer program code, whether loaded into and/or executed by a computer, such that, when the computer program code is loaded into and executed by a computer, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the systems and methods have been described in terms of exemplary embodiments, it is not limited thereto. Rather, the appended claims should be construed broadly, to include other variants and embodiments of the systems and methods, which may be made by those skilled in the art without departing from the scope and range of equivalents of the systems and methods. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A method, comprising:
   a) receiving, at a network coordinator, a request for bandwidth from a first network node of a coordinated network;
   b) broadcasting a first transmission schedule to a plurality of network nodes including the first network node and a second network node, the first transmission schedule allocating bandwidth for the first network node to transmit data to the second network node; and
   c) receiving, at the network coordinator, an acknowledgement (ACK) message from the second network node, the ACK message identifying that the second network node successfully received the data from the first network node.

2. The method of claim 1, wherein the ACK message is embedded within a request for bandwidth received from the second network node.

3. The method of claim 1, further comprising:
   d) receiving a negative ACK (NACK) message in a request for bandwidth from the second network node, the NACK message identifying that the data transmission from the first network node to the second network node was not successful; and
   e) broadcasting a second transmission schedule to a plurality of network nodes including the first network node, the second transmission schedule reallocating bandwidth for the first network node to retransmit the data to the second network node.

4. The method of claim 3, wherein steps d) and e) are performed before step c).

5. The method of claim 3, wherein the reallocated bandwidth in the second transmission schedule is the same as the bandwidth allocated in the first transmission schedule, and wherein the bandwidth is reallocated in response to receiving the NACK message.

6. A network node, comprising:
   a receiver configured to receive a request for bandwidth from a first network node of a coordinated network and an acknowledgement (ACK) message from a second network node of the coordinated network;
   a processor in data communication with the receiver, the processor configured to generate a first transmission schedule allocating bandwidth for the first network node to transmit data to the second network node; and
   a transmitter in data communication with the processor, the transmitter configured to transmit the first transmission schedule to the first network node,
   wherein the ACK message identifies that the second network node successfully received the data transmitted by the first network node during the allocated bandwidth.

7. The network node of claim 6, wherein the ACK message is embedded within a request for bandwidth received from the second network node.

8. The network node of claim 6, wherein
the receiver is configured to receive a negative ACK (NACK) message in a request for bandwidth from the second network node, the NACK message identifying that the data transmission from the first network node to the second network node was not successful,
the processor is configured to generate a second transmission schedule including reallocated bandwidth for the first network node to retransmit the data to the second network node, and
the transmitter is configured to transmit the second transmission schedule to the first network node.

9. The network node of claim 8, wherein the reallocated bandwidth in the second transmission schedule is the same as the bandwidth allocated in the first transmission schedule, and wherein the bandwidth is reallocated in response to receiving the NACK message.

10. A non-transitory computer readable storage medium encoded with program code, wherein when the program code is executed by a processor, the processor performs a method, the method comprising:
    a) receiving a request for bandwidth from a first network node of a coordinated network;
    b) broadcasting a first transmission schedule to a plurality of network nodes including the first network node, the first transmission schedule allocating bandwidth for the first network node to transmit data to a second network node; and
    c) receiving an acknowledgement (ACK) message from the second network node, the ACK message identifying that the second network node successfully received the data from the first network node.

11. The non-transitory computer readable storage medium of claim 10, wherein the ACK message is embedded within a request for bandwidth received from the second network node.

12. The non-transitory computer readable storage medium of claim 10, the method further comprising:
    d) receiving a negative ACK (NACK) message in a request for bandwidth from the second network node, the NACK message identifying that the data transmission from the first network node to the second network node was not successful; and
    e) broadcasting a second transmission schedule to a plurality of network nodes including the first network node, the second transmission schedule reallocating bandwidth for the first network node to retransmit the data to the second network node.

13. The non-transitory computer readable storage medium of claim 12, wherein the reallocated bandwidth in the second transmission schedule is the same as the bandwidth allocated in the first transmission schedule, and wherein the bandwidth is reallocated in response to receiving the NACK message.

14. The non-transitory computer readable storage medium of claim 12, wherein steps d) and e) are performed prior to step c).

15. A method, comprising:
    a) transmitting a request for bandwidth to a network controller of a coordinated network, the request for bandwidth for transmitting data to a first node;
    b) receiving a first transmission schedule for each of a plurality of network nodes in the coordinated network from the network coordinator, the first transmission schedule allocating bandwidth for transmitting the data to the first network node;
    c) transmitting the data to the first network node in the allocated bandwidth in accordance with the first transmission schedule;
    d) receiving a second transmission schedule for each of the plurality of network nodes in the coordinated network after having transmitted the data to the first network node in the allocated bandwidth in accordance with the first transmission schedule; and
    e) determining that the data was successfully transmitted to the first network node based on the second transmission schedule and in the absence of receiving an acknowledgement message from the first network node.

16. The method of claim 15, further comprising:
    f) receiving a second transmission schedule for each of the plurality of network nodes in the coordinated network from the network controller, the second transmission schedule reallocating bandwidth to retransmit the data to the first network node; and
    g) retransmitting the data to the first network node in the allocated bandwidth in accordance with the second transmission schedule.

17. The method of claim 16, wherein the reallocated bandwidth in the second transmission schedule is the same as the bandwidth allocated in the first transmission schedule.

18. A network node, comprising:
    a transmitter configured to transmit a request for bandwidth to a network controller and to transmit data to a first network node; and
    a receiver configured to receive a first transmission schedule from a network coordinator, the first transmission schedule allocating the bandwidth to transmit the data to the first network node,
    wherein
        the transmitter transmits the data to the first network node in accordance with the allocated bandwidth in the first transmission schedule received from the network controller of the coordinated network, and
        the network node is configured to determine that the data was successfully transmitted to the first network node in the absence of receiving an acknowledgement message from the first network node.

19. The network node of claim 18, wherein
the receiver is configured to receive a second transmission schedule for each of the plurality of network nodes in the coordinated network from the network controller, the second transmission schedule reallocating bandwidth to retransmit the data to the first network node, and
the transmitter is configured to retransmit the data to the first network node in the reallocated bandwidth in accordance with the second transmission schedule.

20. The network node of claim 19, wherein the reallocated bandwidth in the second transmission schedule is the same as the bandwidth allocated in the first transmission schedule.

21. A non-transitory computer readable storage medium encoded with program code, wherein when the program code is executed by a processor, the processor performs a method, the method comprising:
    a) transmitting a request for bandwidth to a network controller of a coordinated network, the request for bandwidth for transmitting data to a first network node;
    b) receiving a first transmission schedule for each of a plurality of network nodes in the coordinated network from the network coordinator, the first transmission schedule allocating the bandwidth to transmit the data to the first network node;

c) transmitting the data to the first network node in the allocated bandwidth in accordance with the first transmission schedule;
d) receiving a second transmission schedule for each of the plurality of network nodes in the coordinated network after having transmitted the data to the first network node in the allocated bandwidth in accordance with the first transmission schedule; and
e) determining that the data was successfully transmitted to the first network node based on the second transmission schedule and in the absence of receiving an acknowledgment message from the first network node.

22. The non-transitory computer readable storage medium of claim 21, the method further comprising:
f) receiving a second transmission schedule for each of the plurality of nodes in the coordinated network from the network controller, the second transmission schedule reallocating the bandwidth to retransmit the data to the first network node; and
g) retransmitting data to the first network node in the reallocated bandwidth in accordance with the second transmission schedule.

23. The non-transitory computer readable storage medium of claim 22, wherein the reallocated bandwidth in the second transmission schedule is the same as the bandwidth allocated in the first transmission schedule.

24. A method, comprising:
a) receiving a first transmission schedule for each of a plurality of network nodes in a coordinated network from a network coordinator, the first transmission schedule allocating bandwidth for receiving data from a first network node;
b) receiving the data from the first network node in accordance with the first transmission schedule; and
c) transmitting an acknowledgement (ACK) message to the network coordinator if the data is successfully received from the first network node.

25. The method of claim 24, wherein the ACK message is included in a request for bandwidth.

26. The method of claim 24, further comprising:
d) transmitting a negative ACK (NACK) message to the network coordinator in a request for bandwidth if the data is not successfully received from the first network node;
e) receiving a second transmission schedule for each of the plurality of network nodes in the coordinated network from the network coordinator, the second transmission schedule reallocating the bandwidth for receiving the data from the first network node; and
f) receiving the data from the first network node in accordance with the second transmission schedule from the first network node.

27. The method of claim 26, wherein the reallocated bandwidth in the second transmission schedule is the same as the bandwidth allocated in the first transmission schedule.

28. The method of claim 26, wherein the first and second transmission schedules are media access plan (MAP) packets in a Multimedia over Coaxial Alliance (MoCA) network.

29. The method of claim 26, wherein steps d), e), and f) are performed before step c).

30. A network node, comprising:
a receiver configured to
receive a first transmission schedule from a network coordinator in a coordinated network, the first transmission schedule allocating bandwidth for receiving data from a first network node, and
receive the data from the first network node in accordance with the first transmission schedule;
a processor in data communication with the receiver, the processor configured to determine if the data is successfully received from the first network node; and
a transmitter in data communication with the processor, the transmitter configured to transmit an acknowledgement (ACK) message to the network coordinator if the processor determines the data is successfully received from the first network node.

31. The network node of claim 30, wherein the ACK message is included in a request for bandwidth.

32. The network node of claim 30, wherein
the transmitter is configured to transmit a negative ACK (NACK) message in a request for bandwidth to the network coordinator if the processor determines that the data is not successfully received from the first network node, and
the receiver is configured to
receive a second transmission schedule from the network coordinator, the second transmission schedule reallocating the bandwidth for receiving the data from the first network node, and
receive the data from the first network node in accordance with the second transmission schedule.

33. The network node of claim 32, wherein the reallocated bandwidth in the second transmission schedule is the same as the bandwidth allocated in the first transmission schedule.

34. The network node of claim 32, wherein the first and second transmission schedules are media access plan (MAP) packets in a Multimedia over Coaxial Alliance (MoCA) network.

35. A non-transitory computer readable storage medium encoded with program code, wherein when the program code is executed by a processor, the processor performs a method, the method comprising:
a) receiving a first transmission schedule for each of a plurality of network nodes in a coordinated network from a network coordinator, the first transmission schedule allocating bandwidth for receiving data from a first network node;
b) receiving the data from the first network node in accordance with the first transmission schedule; and
c) transmitting an acknowledgement (ACK) message to the network coordinator if the data is successfully received from the first network node.

36. The non-transitory computer readable storage medium of claim 35, wherein the ACK message is included in a request for bandwidth.

37. The non-transitory computer readable storage medium of claim 35, the method further comprising:
d) transmitting a negative ACK (NACK) message to the network coordinator in a request for bandwidth if the data is not successfully received from the first network node;
e) receiving a second transmission schedule for each of the plurality of network nodes in the coordinated network from the network coordinator, the second transmission schedule reallocating the bandwidth for receiving the data from the first network node; and
f) receiving the data from the first network node in accordance with the second transmission schedule.

38. The non-transitory computer readable storage medium of claim 37, wherein the reallocated bandwidth in the second transmission schedule is the same as the bandwidth allocated in the first transmission schedule.

39. The non-transitory computer readable storage medium of claim 37, wherein the first and second transmission schedules are media access plan (MAP) packets in a Multimedia over Coaxial Alliance network.

40. The non-transitory computer readable storage medium of claim 37, wherein steps d), e), and f) are performed before step c).

* * * * *